United States Patent
Yin

(10) Patent No.: US 9,426,500 B2
(45) Date of Patent: Aug. 23, 2016

(54) OPTIMAL QUALITY ADAPTIVE VIDEO DELIVERY

(71) Applicant: Verizon and Redbox Digital Entertainment Services, LLC, Basking Ridge, NJ (US)

(72) Inventor: Fenglin Yin, Lexington, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 100 days.

(21) Appl. No.: 14/156,153

(22) Filed: Jan. 15, 2014

(65) Prior Publication Data

US 2015/0201225 A1    Jul. 16, 2015

(51) Int. Cl.
| | | |
|---|---|---|
| H04N 21/2343 | (2011.01) | |
| H04N 21/472 | (2011.01) | |
| H04N 21/258 | (2011.01) | |
| H04N 21/426 | (2011.01) | |
| H04N 21/81 | (2011.01) | |
| H04N 21/858 | (2011.01) | |
| H04N 21/238 | (2011.01) | |
| H04N 21/2385 | (2011.01) | |
| H04N 21/262 | (2011.01) | |
| H04N 21/845 | (2011.01) | |
| H04N 21/442 | (2011.01) | |

(52) U.S. Cl.
CPC ..... *H04N 21/23439* (2013.01); *H04N 21/2385* (2013.01); *H04N 21/23805* (2013.01); *H04N 21/234345* (2013.01); *H04N 21/25833* (2013.01); *H04N 21/25858* (2013.01); *H04N 21/26216* (2013.01); *H04N 21/426* (2013.01); *H04N 21/4424* (2013.01); *H04N 21/47202* (2013.01); *H04N 21/8193* (2013.01); *H04N 21/8456* (2013.01); *H04N 21/8586* (2013.01)

(58) Field of Classification Search
CPC .............. H04L 29/06027; H04L 47/10; H04L 65/4038; H04L 65/80; H04L 67/02; H04L 67/303; H04L 69/40
See application file for complete search history.

(56) References Cited

U.S. PATENT DOCUMENTS

| 7,356,575 | B1 * | 4/2008 | Shapiro | 709/220 |
|---|---|---|---|---|
| 8,914,836 | B2 * | 12/2014 | Shivadas | H04N 21/27 725/109 |
| 9,189,151 | B2 * | 11/2015 | Johansson | G06F 3/04883 |
| 2002/0095609 | A1 * | 7/2002 | Tokunaga | G06F 1/3203 713/300 |
| 2002/0116518 | A1 * | 8/2002 | Silen et al. | 709/231 |
| 2007/0024705 | A1 * | 2/2007 | Richter et al. | 348/142 |
| 2007/0150480 | A1 * | 6/2007 | Hwang | G06Q 10/00 |

(Continued)

OTHER PUBLICATIONS

Bretz, Rudy, A Taxonomy of Communication Media, p. 79, 1971.*

*Primary Examiner* — Mark D Featherstone
*Assistant Examiner* — Krista A Contino Saumby

(57) ABSTRACT

A method, performed by a computer device, may include receiving a request for a video asset from a user device, wherein the request includes information identifying a device type associated with the user device and a processor load associated with the user device. The method may further include determining a bandwidth capacity associated with a connection to the user device; selecting a codec and a quality level for the requested video asset based on the device type, the processor load, and the determined bandwidth capacity; identifying a Uniform Resource Identifier associated with the selected codec and quality level for the requested video asset; and providing the identified Uniform Resource Identifier to the user device.

18 Claims, 11 Drawing Sheets

(56) References Cited

U.S. PATENT DOCUMENTS

| | | | |
|---|---|---|---|
| 2007/0189275 A1* | 8/2007 | Neff | 370/352 |
| 2008/0127255 A1* | 5/2008 | Ress et al. | 725/38 |
| 2013/0290465 A1* | 10/2013 | Harrison et al. | 709/213 |
| 2014/0164483 A1* | 6/2014 | Losev et al. | 709/203 |
| 2014/0219331 A1* | 8/2014 | Pai et al. | 375/240.02 |
| 2014/0289371 A1* | 9/2014 | Moore | 709/219 |

* cited by examiner

OPTIMAL QUALITY ADAPTIVE VIDEO DELIVERY

BACKGROUND INFORMATION

Video content may be available from many sources and may be delivered to users through a variety of methods. For example, video content may be available from commercial broadcasting television networks (e.g., ABC®, CBS®, NBC®, FOX®, etc.) via free broadcast; from a cable television service (e.g., CNN®, TNT®, TBS®, etc.) for a periodic subscription fee; from a satellite television service (e.g. DIRECTTV®, DISH NETWORK®, etc.) for a periodic subscription fee; from a pay-per-view service; from an on-demand video service; from a over-the-top (OTT) content providers on the Internet (e.g., HULU®, VEOH®, JAMAN®, YOUTUBE®, etc.); and/or from any other commercial supplier (e.g., ITUNES®, NETFLIX®, BLOCKBUSTER®, etc.). Video content may be delivered to users, for example, via a set top box, a computer device, or a wireless mobile device.

DETAILED DESCRIPTION OF PREFERRED EMBODIMENTS

Figure 1:
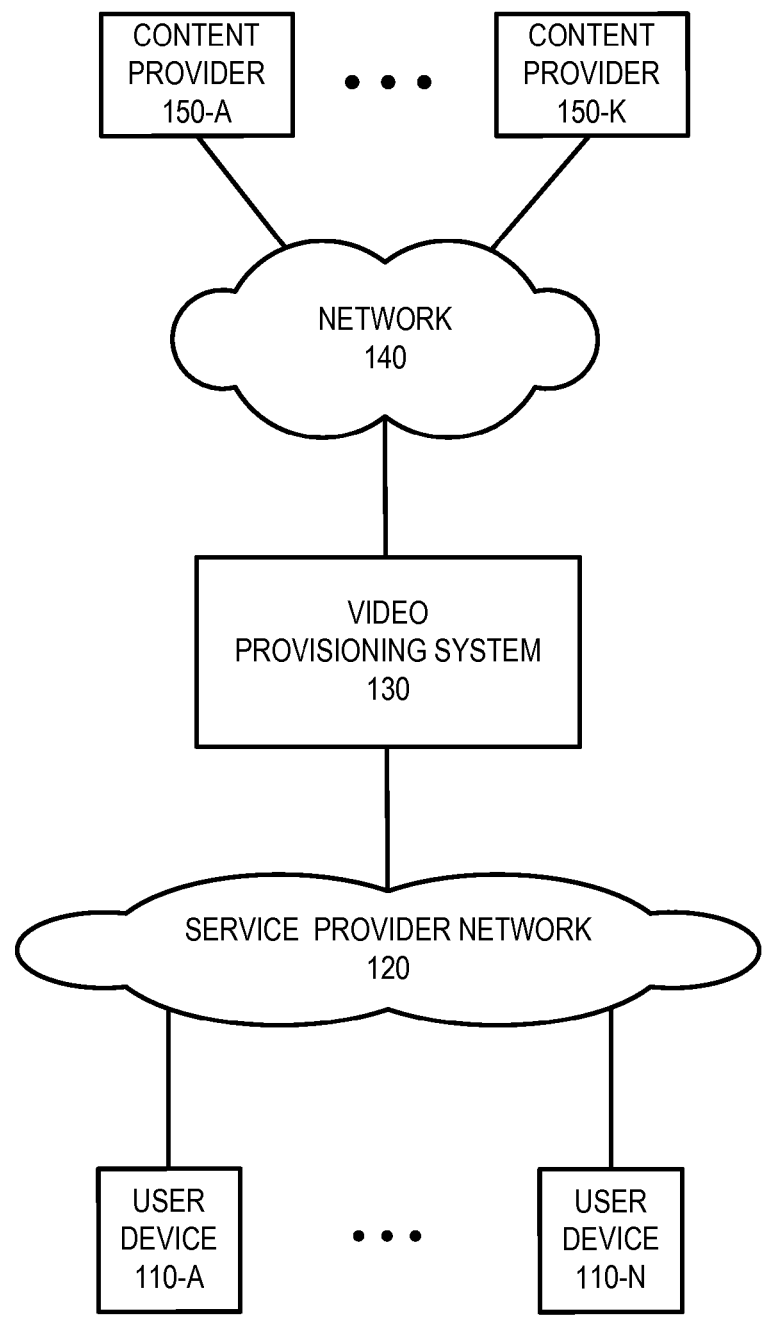
FIG. 1 is a diagram illustrating an environment according to an implementation described herein.

The following detailed description refers to the accompanying drawings. The same reference numbers in different drawings identify the same or similar elements.

Implementations described herein relate to optimal quality adaptive video delivery for video assets. The phrase "video asset," as used herein, may include Video On Demand (VOD) content, pay-per-view (PPV) video content, rented video content, live broadcasts, free television content (e.g., from free television broadcasters, etc.), paid for television content (e.g., from pay television content providers), on-line video content (e.g., on-line television programs, movies, videos, etc.), advertising, games, music videos, promotional information (e.g., such as previews, trailers, etc.), etc.

A video asset may be stored as a plurality of sequential video asset segments referred to herein as a "video asset presentation." Adaptive video presentation may classify a video asset presentation for a particular video asset segment into a number of different video quality levels. Each video quality level may be characterized by one or more of a particular color depth, a particular chroma subsampling rate, a particular frame rate, a particular bit rate, and/or additional factors. A video asset presentation may be stored with multiple quality levels for each video asset segment. Furthermore, a video asset presentation may be stored using multiple coders-decoders, referred to herein as codecs. Each codec may include video asset segments stored with multiple quality levels. A higher efficiency codec may require less bandwidth to transmit, but may require more CPU power to decode.

Different user devices may be configured to handle different codecs. For example, legacy devices may be configured to handle (e.g., decode) a Moving Picture Experts Group Two (MPEG-2) codec, other user devices may be configured to handle an MPEG-4 codec, and still other devices may configured to handle a High Efficiency Video Coding (HEVC) codec. Implementations described herein relate to determining a device type for a user device requesting a particular video asset and selecting a particular codec based on the device type.

Furthermore, user devices may experience an environment of changing bandwidth and changing computing power. For example, a mobile communication device may be running a video playing application and another application that may compete with the video playing application for Central Processing Unit (CPU) power and/or networking bandwidth. Implementations described herein relate to selecting a codec for a requested video asset based on a processor load associated with a user device. Furthermore, implementations described herein relate to selecting a video asset quality level for the requested video asset based on network bandwidth capacity associated with a connection to the user device.

When the next video asset segment is requested by the user device, the processor load and/or network bandwidth capacity may be re-evaluated and a different codec and/or quality level may be automatically selected for the next video asset segment if the processor load and/or network bandwidth capacity has changed. Thus, the selected codec and quality level for a video asset, being viewed by a user via a user device, may change dynamically in real time while the user is viewing the video asset.

FIG. 1 is a diagram of an exemplary environment 100 in which the systems and/or methods, described herein, may be implemented. As shown in FIG. 1, environment 100 may include user devices 110-A to 110-N (referred to herein collectively as "user devices 110" and individually as "user device 110"), service provider network 120, a Video Provisioning System (VPS) 130, a network 140, and content providers 150-A to 150-K (referred to herein collectively as "content providers 150" and individually as "content provider 150"). Devices, systems, and/or networks of environment 100 may interconnect via wired connections, wireless connections, or a combination of wired and wireless connections.

User device 110 may include a computation or communication device that is capable of communicating with service provider network 120. For example, user device 110 may include a portable communication device (e.g., a mobile phone, a smart phone, a phablet device, a global positioning system (GPS) device, and/or another type of wireless device);

a laptop, tablet, or another type of portable computer; a media playing device; a portable gaming system; a desktop computer; a set top box; a digital video recorder (DVR); a gaming system; and/or another type of computation or communication device. User device 110 may communicate with VPS 130 and/or perform certain operations to obtain a video asset from VPS 130. For example, user device 110 may access a portal (e.g., a website, a user interface, an interactive program guide (IPG), an interactive media guide (IMG), etc.) associated with VPS 130, to browse, search, select, and/or obtain a video asset.

Service provider network 120 may include one or more wired and/or wireless networks via which user devices 110 communicate with and/or receive video content from VPS 130. For example, service provider network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 120 may include a code division multiple access (CDMA) network, a global system for mobile communications (GSM) network, a general packet radio services (GPRS) network, or a combination of CDMA, GSM, and/or GPRS networks. Additionally, or alternatively, service provider network 120 may include a wide area network (WAN), a metropolitan area network (MAN), an ad hoc network, an intranet, a fiber optic-based network (e.g., a fiber optic service (FiOS) network), a television network, and/or a combination of these or other types of networks.

VPS 130 may include one or more devices that gather, process, search, store, and/or provide information in a manner similar to that described herein. VPS 130 may be capable of communicating with content providers 150 via network 140 and/or user devices 110 via service provider network 130. VPS 130 may provide a video provisioning service to user devices 110. VPS 130 may, for example, perform operations associated with video content ingestion, processing, and/or distribution for one or more types of user devices 110, associated with a user, within environment 100. VPS 130 may communicate with one or more content providers 150 to acquire video content. VPS 130 may connect to a collection of various types user devices 110 associated with a user, such as, for example, a set top box, a computer device, a wireless handset device (e.g., a smart phone, a tablet computer, etc.), and/or other types of user devices 110. VPS 130 may connect to the set top box via a television service provider network 120 (e.g., a cable television network, a satellite television network, a fiber optic television network, or some combination thereof). VPS 130 may connect to the computer device via a broad band service provider network 120 (e.g., via the Internet). VPS 130 may connect to the wireless handset device via a wireless service provider network 120. VPS 130 may perform an ingestion operation on the acquired video content. VPS 130 may process and/or publish the ingested video content in a manner that allows the video content to be offered and/or distributed to the different types of user devices 110.

Network 140 may include one or more wired and/or wireless networks. For example, network 140 may include a cellular network, the PLMN, a 2G network, a 3G network, a 4G network (e.g., an LTE network), a 5G network, and/or another network. Additionally, or alternatively, network 140 may include a WAN, a MAN, a telephone network (e.g., the Public Switched Telephone Network (PSTN)), an ad hoc network, an intranet, the Internet, a fiber optic-based network, and/or a combination of these or other types of networks.

Content provider 150 may include any type or form of content provider. For example, content provider 150 may include free television broadcast providers (e.g., local broadcast providers, such as NBC®, CBS®, ABC®, and/or FOX®), for-pay television broadcast providers (e.g., TNT®, ESPN®, HBO®, CINEMAX®, CNN®, etc.), and/or Internet-based content providers (e.g., YOUTUBE®, VIMEO®, NETFLIX®, HULU®, VEOH®, etc.) that stream content from web sites and/or permit content to be downloaded (e.g., via progressive download, etc.). Content provider 150 may include on-demand content providers (e.g., video on demand (VOD), pay per view (PPV), etc.). A media stream, as used herein, may refer to a stream of content that includes video content (e.g., a video stream), audio content (e.g., an audio stream), and/or textual content (e.g., a textual stream).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
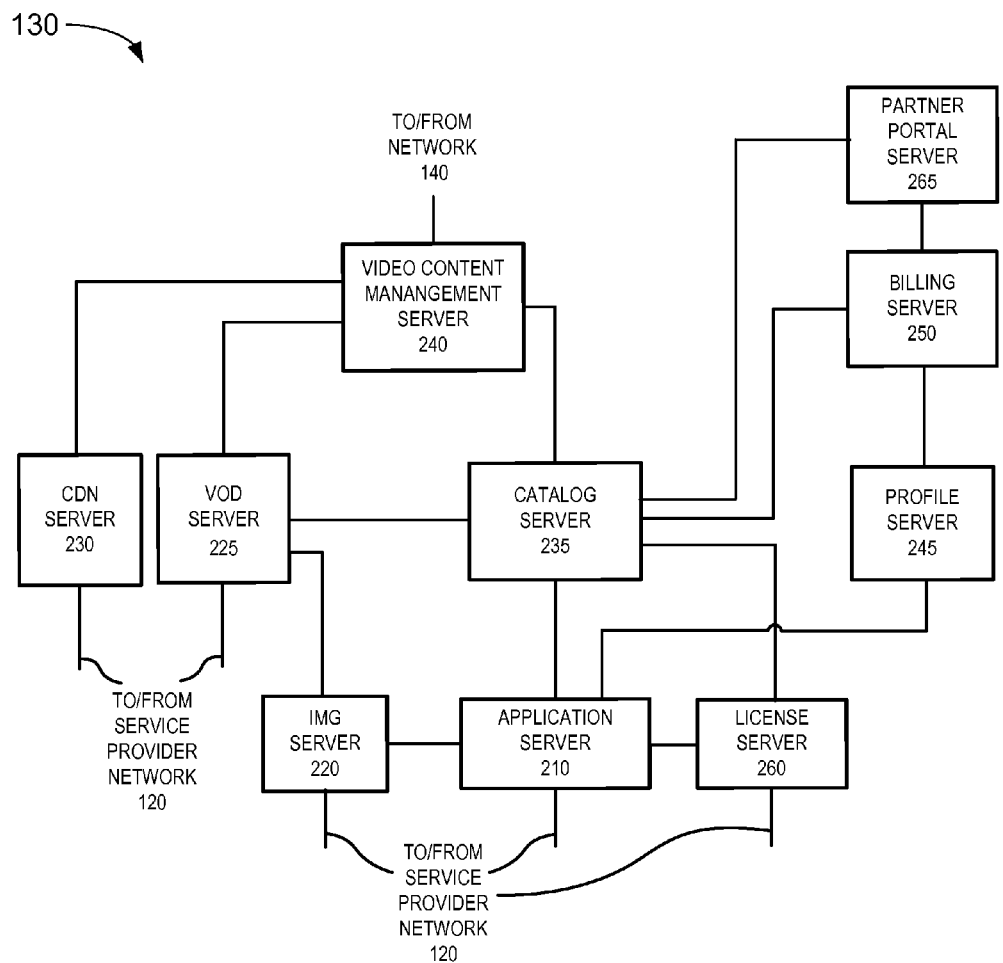
FIG. 2 is a diagram illustrating exemplary components of the video provisioning system of FIG. 1.

FIG. 2 is a diagram of exemplary components of VPS 130. As shown in FIG. 2, VPS 130 may include an application server 210, an interactive media guide (IMG) server 220, a video on-demand (VOD) server 225, a content delivery network (CDN) server 230, a catalog server 235, a video content management (VCM) server 240, a profile server 245, a billing server 250, a license server 260, and a partner portal server 265.

Application server 210 may include one or more server devices, or other types of computation or communication devices that receive metadata that has been published by catalog server 235. Metadata may enable the video assets to be identified, managed, offered, and/or distributed to a user device. The metadata may, for example, include an identifier associated with a video asset (e.g., a number, a name, a title, etc.); a genre of the video asset (e.g., horror, comedy, adult, etc.); a category of the video asset (e.g., VOD asset, a PPV asset, an on-line asset, etc.); a text description, a key word index, and/or summary of the video asset; an image (e.g., cover art) associated with the video asset, and/or information associated with artists associated with the video asset (e.g., names of actors, directors, producers, etc.). The metadata may also, or alternatively, include information associated with a type of video asset (e.g., a movie, music video, a game, etc.); a rating associated with the video asset (e.g., general audience (G), parental guidance (PG), PG-13, restricted (R), mature audience (MA), etc.); user reviews associated with the video asset; a price associated with the video asset (e.g., a sale price, a rental price per day, a pay-per-view price, etc.); and/or an availability period associated with the video asset (e.g., release dates, restriction periods, blackout periods, etc.). The metadata may also, or alternatively, include information associated with a storage location (e.g., a uniform resource identifier (URI)) corresponding to the video asset; a format associated with the video asset (e.g., a resolution level, compression/decompression (codec) information, a screen size, a frame size, a frame refresh rate, a bit rate, etc.); and/or types of user devices supported by each format, etc.

The metadata may be associated with video assets that are to be made available and/or offered (e.g., for sale, rent, subscription, etc.) to user devices 110. Application server 210 may host a portal (e.g., a VPS store front), such as a private website (e.g., for subscribing user devices 110), a public website (e.g., for non-subscribing user devices 110), a user interface (UI) (e.g., that is accessible by wireless handset user devices 110, etc.), an interactive program guide (e.g., an IMG for set top box-type user devices 110) and/or other types of user interfaces. The portal may enable single sign-on (SSO) portal access, to a user of one or more user devices 110, based on the same login credentials (e.g., username, password, personal identification number (PIN), etc.). Application server 210 may publish all or a portion of the metadata to the portal that permits any of user devices 110 to browse, perform searches, process payment, etc., for video assets based on the metadata that is published to the portal.

Application server 210 may store information associated with a transaction history for one or more video assets associated with a user device 110 other than a set top box device. The transaction history may also identify a period of time during which a rental period or subscription period, for a video asset, is valid. Application server 210 may transmit the transaction history information to profile server 245, to be stored in a user profile associated with a user of user device 110.

IMG server 220 may include one or more server devices, or other types of computation or communication devices, that process metadata, that has been published by catalog server 235 and/or VOD server 225, in a manner similar to that described above (e.g., with respect to application server 210). The metadata may be associated with video content that may be obtained by a particular type of user device 110, such as a set top box user device 110. IMG server 220 may publish all or a portion of the metadata to an IMG user interface (UI) that the set top box user device 110, associated with the user, may render for display on a video display device. IMG server 220 may permit the set top box user device 110 to access information associated with video assets, stored by VOD server 225, and access the actual video assets. IMG server 220 may, in another exemplary implementation, communicate with application server 210, which may permit the set top box user device 110 to access the metadata associated video assets that are stored in CDN server 230. IMG server 220 may store information associated with a transaction history that corresponds to a set top box user device 110. IMG server 220 may transmit the transaction history information to be stored in a user profile associated with a user of user device 110.

VOD server 225 may include one or more server devices, or other types of computation or communication devices, that perform operations to receive, store, process, and/or distribute video content in a format that is supported by set top box user devices 110. VOD server 225 may receive published video assets and/or metadata from VCM server 240. VOD server 225 may store the published video assets in a memory associated with VOD server 225. VOD server 225 may publish a portion of the metadata, associated with video assets (e.g., that are available for release and/or not subject to a blackout, etc.), to IMG server 220. In another exemplary implementation, VOD server 225 may communicate with content provider 150 to receive video content directly from content provider 150 (e.g., not via VCM server 240).

CDN server 230 may include one or more server devices, or other types of computation or communication devices, that perform operations to receive, store, process, and/or distribute video content in a format that is supported by one or more types of user devices 110 (e.g., a computer device, a wireless mobile device, a gaming device, etc.) other than, or in addition to, a set top box user device 110. In some implementations, CDN server 230 may represent a content delivery network that includes multiple routing and/or storage devices.

CDN server 230 may receive published video assets in multiple video formats from VCM server 240. CDN server 230 may store the published video assets in a memory associated with CDN server 230. CDN server 230 may identify a respective storage location and/or URI for each format of each video asset that are stored within the memory and may send information associated with the storage locations and/or the URIs to catalog server 235. CDN server 230 may provide video assets to wireless handset user devices 110 via a wireless service provider network 120. CDN server 230 may provide the video assets to a computer user device 110 via a broadband service provider network 120 (e.g., the Internet). In another exemplary implementation, CDN server 230 may provide the video assets to a set top box user device 110 via a television service provider network 120 and/or via VOD server 225.

Catalog server 235 may include one or more server devices, or other types of computation or communication devices, which receive, from VCM server 240, published metadata associated with video assets that have been published to VOD server 225 and/or CDN server 230. Catalog server 235 may identify, from the metadata, information associated with the availability of the video assets based on dates on which the video assets are released, blacked out, etc. Catalog server 235 may process and/or package the metadata in order to offer, to user devices 110, the video assets to which the metadata corresponds. The processed metadata, associated with the video assets, may include identifiers (e.g., video asset numbers, titles, etc.), prices (e.g., sale prices, rental prices, subscription prices, etc.), descriptions (e.g., a synopsis, a summary, etc. of the video assets), ratings, reviews, genres, casting information (e.g., actors, directors, producers, etc.), etc. Catalog server 235 may, for example, publish the metadata to the store front portal associated with VPS application server 210. Catalog server 235 may not publish metadata associated with video assets that are identified as not yet being available.

VCM server 240 may include one or more server devices, or other types of computation or communication devices, that communicate with content providers 150 to ingest video assets to be processed by VPS 130. VCM server 240 may process the video assets to generate copies of the video assets in one or more formats that are supported (e.g., that can be received, processed, and/or played) by the different types of user devices 210. VCM server 240 may publish the one or more formats, associated with the processed video assets, to VOD server 225 and/or CDN server 230.

VCM server 240 may also ingest, process, and/or publish metadata associated with the video assets. VCM server 240 may process the metadata to ensure that the metadata is supported by the different types of user devices 210. VCM server 240 may publish the processed metadata to catalog server 235. The metadata may include digital rights management (DRM) information. For example, a video asset may be encrypted using a particular DRM scheme and a key, associated with the DRM scheme, may be provided to license server 260.

Profile server 245 may include one or more server devices, or other types of computation or communication devices, that store information associated with a profile that includes information regarding the user and each user device 110 with which the user has registered with VPS 130. For example, information associated with the profile may further include information associated with the user (e.g., a username, password, PIN, etc.), information associated with each user device 110, such as a respective identifier (e.g., a mobile directory number (MDN), an Internet protocol (IP) address, a media access control (MAC) address, a CODEC identifier, etc.), and/or information associated with a type of user device 110, such as a computer device (e.g., a lap top computer, a tablet computer, etc.), a wireless mobile device (e.g., a DROID®, a BLACKBERRY®, IPHONE®, etc.), a set top box, a gaming device, etc.

The information associated with the profile may also include a respective user history (e.g., prior purchases, prior URLs accessed, prior downloads, bookmarks associated with purchased video assets, etc.) associated with each user device 110; information associated with services for which user device 110 has subscribed; information associated with a location (e.g., an address, a zip code, a city, etc.) of the user and/or user device 110; information associated user account limits, restrictions, etc.; information associated with a language spoken by the user; etc. Furthermore, profile server 245 may include, or may communicate with, a viewing session server. A viewing session server may maintain information relating to a last viewing place for a particular video asset that the user has previously viewed.

Billing server 250 may include one or more server devices, or other types of computation or communication devices, that perform billing operations associated with accounts that correspond to each user device 110 associated with a user. For example, billing server 250 may receive an indication that user device 110 (e.g., a computer device), associated with the user, downloaded a video asset (e.g., via a broadband service associated with service provider network 140) as a result of a transaction via the store front portal. Billing server 250 may generate billing information that identifies the video asset, the type of transaction (e.g., a purchase, rental, subscription, etc.), a price associated with the transaction, a time at which the transaction occurred, etc. Billing server 250 may associate the billing information with an account that corresponds to the user and/or user device 110. Billing server 250 may generate other billing information regarding another transaction with another user device 110 (e.g., a set top box) with which the user is associated. Billing server 250 may associate the other billing information with another account that corresponds to the user and/or the other user device 110. In yet another example, billing server 250 may process payment information (e.g., based on credit card information, debit card information, etc.) associated with a transaction with a further user device 110 to purchase, rent, subscribe to, etc., another video asset.

License server 260 may include one or more server devices, or other types of computation or communication devices, that may generate a license, associated with a DRM scheme, and provide the license to a media player in connection with a video asset. The media player may use the license to decrypt the video asset. Partner portal server 265 may include one or more server devices, or other types of computation or communication devices, that enable a partner entity to interact with VPS 130. A partner entity associated with content provider 150 may, for example, use partner portal server 265 to process settlements for purchases of video assets associated with content provider 150.

Although FIG. 2 shows exemplary components of VPS 130, in other implementations, VPS 130 may include fewer components, different components, differently arranged components, or additional components than depicted in FIG. 2. Additionally or alternatively, one or more components of VPS 130 may perform functions described as being performed by one or more other components of VPS 130. For example, in other implementations, VOD server 225 and/or CDN server 230 may be combined into a single device that provisions the video services for each type of user device 110; and/or the video services may be provisioned for each type of user device 110 by another device and/or network instead of, or in combination with, VOD server 225 and/or CDN server 230. As another example, IMG server 220 and/or application server 210 may be combined into a single device that provisions the store front portal for each type of user device 110; and/or the store front portal may be provisioned, for each type of user device 110, by another device and/or network instead of, or in combination with, IMG server 220 and/or application server 210.

Figure 3:
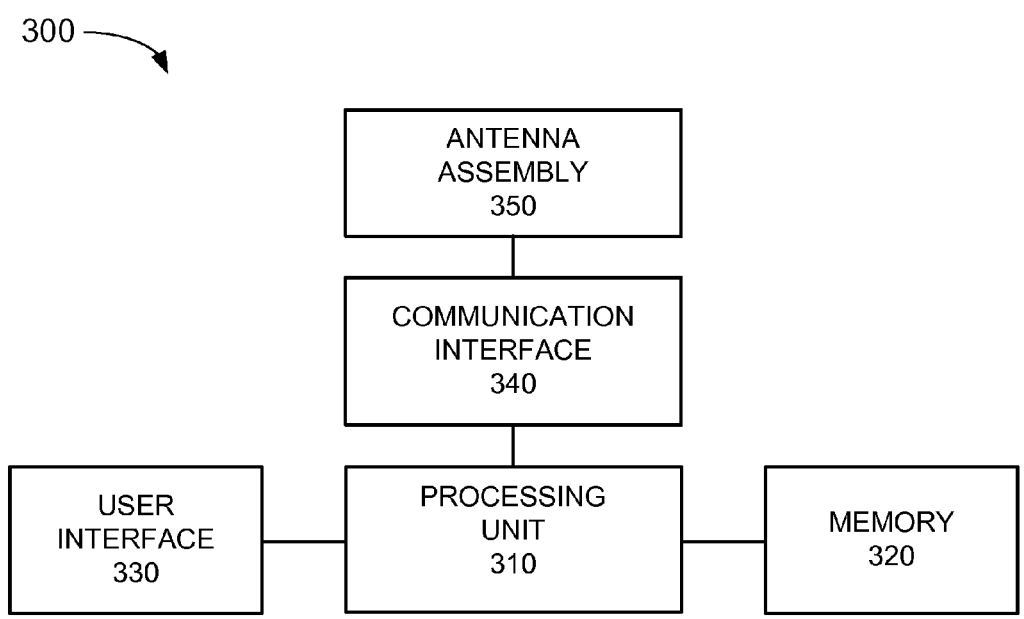
FIG. 3 is a diagram illustrating exemplary components of a user device of FIG. 1.

FIG. 3 is a diagram illustrating exemplary components of a device 300 according to an implementation described herein. A particular user device 110 (e.g., mobile communication device, tablet computer, etc.) may include one or more devices 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of device 300 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 300 to vibrate; a sensor; and/or any other type of input or output device.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a BLUETOOTH™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. Additionally or alternatively, one or more components of device 300 may perform the tasks described as being performed by one or more other components of device 300.

Figure 4:
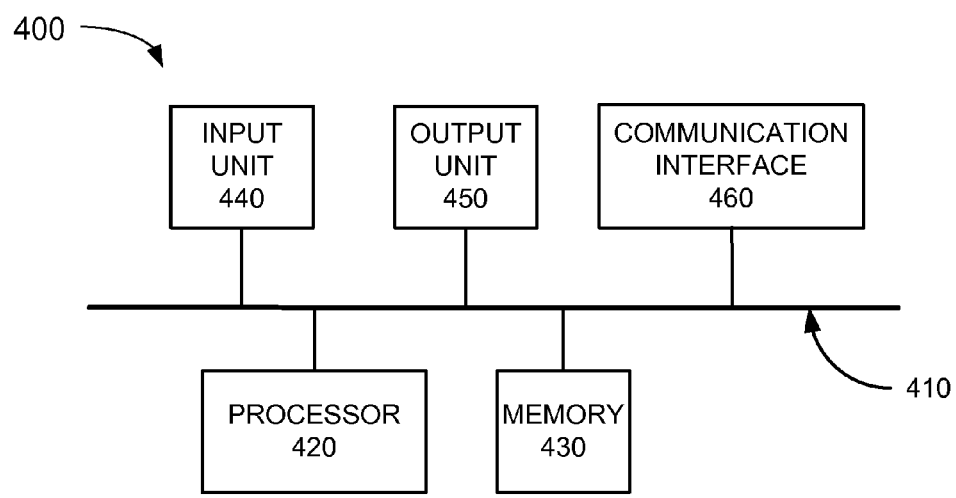
FIG. 4 is a diagram illustrating exemplary components of a device that may correspond to a user device of FIG. 1 or a server device of FIG. 2.

FIG. 4 is a diagram illustrating exemplary components of device 400 according to an implementation described herein. A particular user device 110 (e.g., set top box, desktop computer, gaming system etc.), and/or a particular component of VPS 130 (application server 210, IMG server 220, VOD server 225, CDN server 230, catalog server 235, VCM server 240, profile server 245, billing server 250, license server 260, and/or partner portal server 265) may each include one or more devices 400. As shown in FIG. 4, device 400 may include a bus 410, a processor 420, a memory 430, an input unit 440, an output unit 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 440 may allow an operator to input information into device 400. Input unit 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input unit 440. In other words, device 400 may be "headless" and may not include a keyboard, for example.

Output unit 450 may output information to an operator of device 400. Output unit 450 may include a display, a printer, a speaker, and/or another type of output device. For example, device 400 may include a display, which may include a liquid-crystal display (LCD) for displaying content to the customer. In some embodiments, device 400 may be managed remotely and may not include output unit 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a BLUETOOTH™ wireless interface, a radio-frequency identification (RFID) interface, a near-field communications (NFC) wireless interface, and/or any other type of interface that converts data from one form to another form.

As will be described in detail below, device 400 may perform certain operations relating to selecting a codec and/or a quality for a particular segment of a video asset to be sent to user device 110. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than those depicted in FIG. 4. Additionally or alternatively, one or more components of device 400 may perform one or more tasks described as being performed by one or more other components of device 400.

Figure 5:
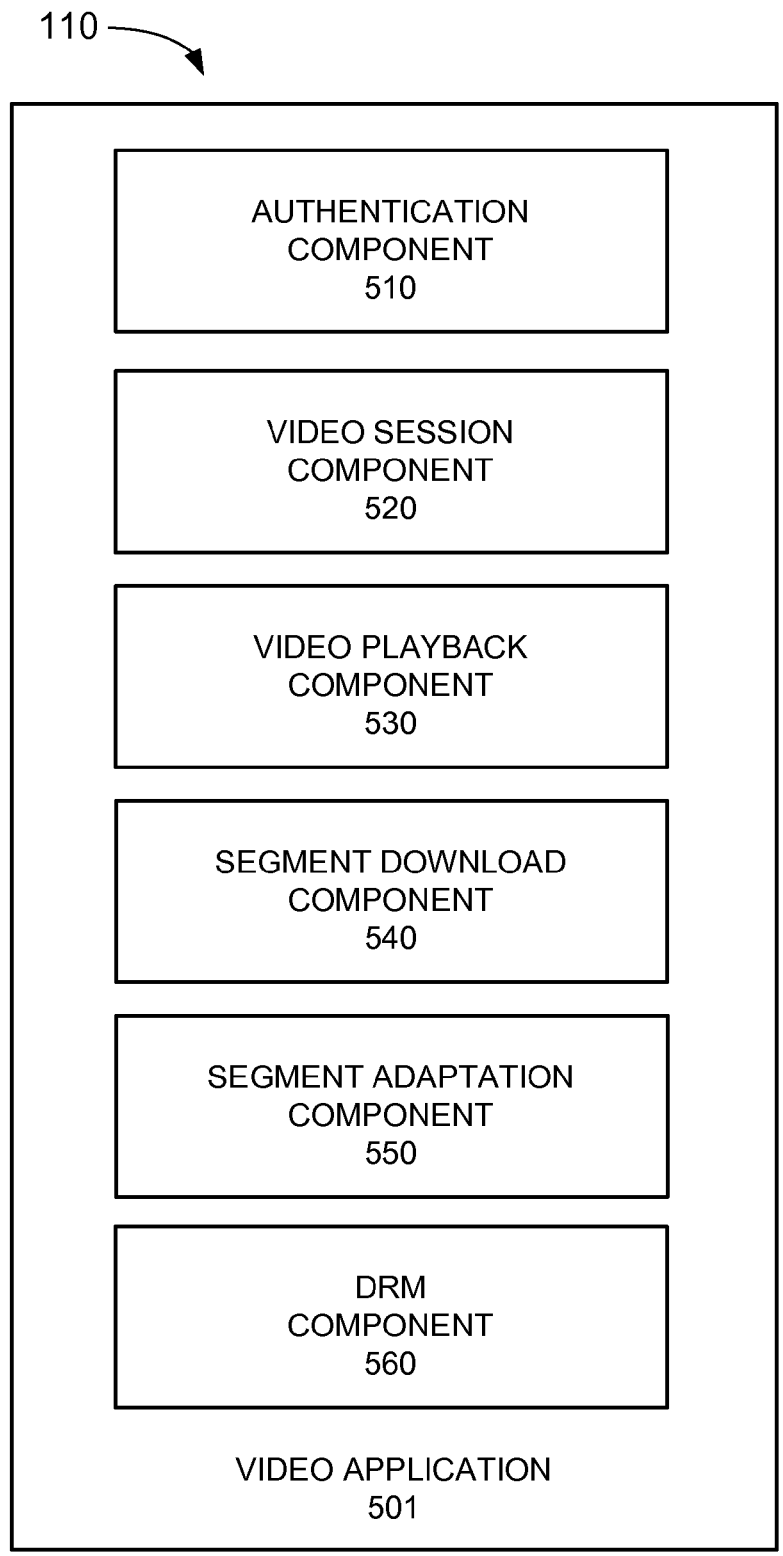
FIG. 5 is a diagram illustrating exemplary functional components of a user device of FIG. 1.

FIG. 5 is a diagram illustrating exemplary functional components of user device 110 (which may correspond to device 300 or device 400) according to an implementation described herein. The functional components of user device 110 may be implemented, for example, via processing unit 310 executing instructions from memory 320, or via processor 420 executing instructions from memory 430. Alternatively, some or all of the functional components of user device 110 may be implemented via hard-wired circuitry.

As shown in FIG. 5, user device 110 may include a video application 501. Video application 501 may be configured to enable user device 110 to play a video asset provided by VPS 130. Video application 501 may include an authentication component 510, a video session component 520, a video playback component 530, a segment download component 540, a segment adaptation component 550, and a DRM component 560.

Authentication component 510 may prompt a user to sign into an account associated with VPS 130 and may provide an authentication token when an authentication token is required to communicate with a particular device of VPS 130. Video session component 520 may periodically update a viewing session server (e.g., implemented by profile server 245) regarding playback of a video asset presentation and may provide to the viewing session server information identifying the last played position of the video asset for the user. Video session component 520 may check a view session response header and may post an event to segment adaptation component 550 when a real time video insertion URI is detected.

Video playback component 530 may play a video asset. For example, video playback component 530 may decode a video asset segment using a particular codec and may output the decoded content to an output device of user device 110. Segment download component 540 may download a particular video asset segment from a storage location, such as from CDN server 230 and/or VOD server 225.

Segment adaptation component 550 may dynamically, and/or in real time, monitor processor load for user device 110 and/or network bandwidth capacity for user device 110 and may provide information relating to the processor load and/or network bandwidth capacity to VPS 130. Furthermore, if a requested video asset corresponds to a live broadcast, segment adaptation component 550 may keep track of the time to fetch the manifestation file and may provide information relating to the time to fetch the manifestation file to VPS 130. Segment adaptation component 550 may obtain a URI for a particular codec and quality level and may provide the determined URI to segment download component 540.

DRM component 560 may interface with license server 260 to obtain a decryption key for a requested video asset. Furthermore, DRM component 560 may check usage rights for the user and the output device security level and may validate the usage rights and the security level before decrypting video asset for playback.

Although FIG. 5 shows exemplary functional components of user device 110, in other implementations, user device 110 may include fewer functional components, different functional components, differently arranged functional components, or additional functional components than those depicted in FIG. 5. Additionally or alternatively, one or more functional components of user device 110 may perform functions described as being performed by one or more other functional components of user device 110.

Figure 6A:
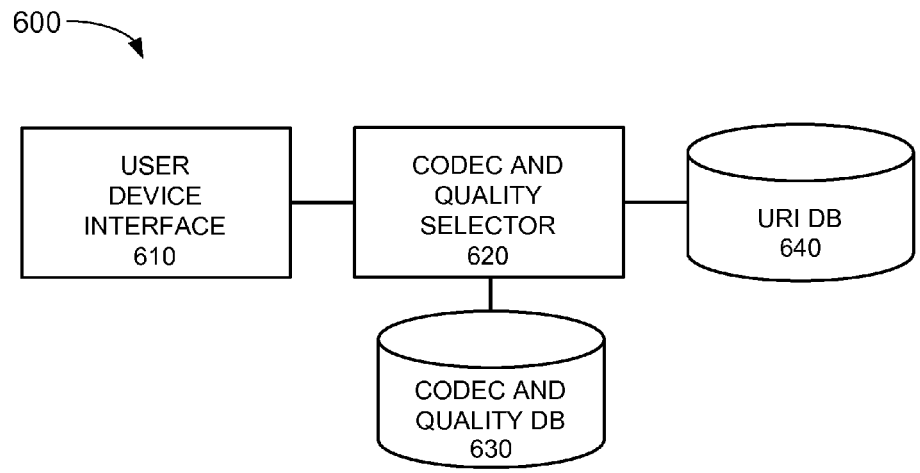
FIG. 6A is a diagram illustrating exemplary functional components of a server device of FIG. 2.

FIG. 6A is a diagram illustrating exemplary functional components of functional device 600 according to an implementation described herein. In some implementations, catalog server 235 may include functional device 600. In other implementations, a different component of VPS 130 may include functional device 600. The functional components of functional device 600 may be implemented, for example, via processor 420 executing instructions from memory 430. Alternatively, some or all of the functional components of functional device 600 may be implemented via hard-wired circuitry.

As shown in FIG. 6A, functional device 600 may include a user device interface 610, a codec and quality selector 620, a codec and quality database (DB) 630, and a URI DB 640.

User device interface 610 may interface with user device 110. For example, user device interface 610 may establish a secure connection with user device 110 over service provider network 120. User device interface 610 may receive a request for video asset segment URI from user device 110 and may provide the URI after determining a codec and/or quality level for the requested video asset segment.

Codec and quality selector 620 may select a particular coded and/or quality level for a requested video asset level for user device 110 based on a device type associated with user device 110, based on a processor load associated with user device 110, and/or based on a network bandwidth capacity associated with user device 110, using codec and quality DB 630. Codec and quality DB 630 may store a table that relates particular device types, processor loads, and network bandwidth capacity levels with particular codecs and/or quality levels. Exemplary information that may be stored in codec and quality DB 630 is described below with reference to FIG. 6B.

URI DB 640 may store URIs associated with particular video assets. For example, for each video asset segment associated with a particular video asset, URI DB 640 may store a URI for each available quality level, for each available codec.

Although FIG. 6A shows exemplary functional components of functional device 600, in other implementations, functional device 600 may include fewer functional components, different functional components, differently arranged functional components, or additional functional components than those depicted in FIG. 6A. Additionally or alternatively, one or more functional components of functional device 600 may perform functions described as being performed by one or more other functional components of functional device 600.

Figure 6B:
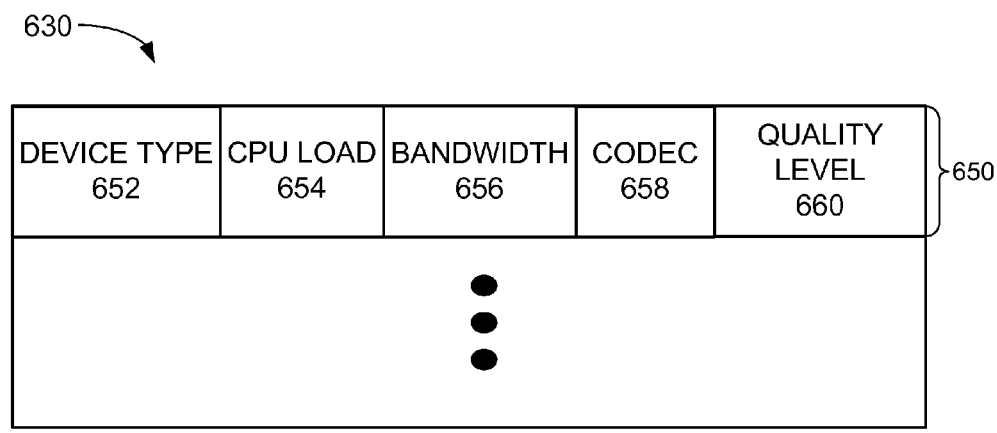
FIG. 6B is a diagram illustrating exemplary components that may be stored in the codec and quality database of FIG. 6A.

FIG. 6B is a diagram illustrating exemplary components that may be stored in the codec and quality DB 630. As shown in FIG. 6B, codec and quality DB 630 may include one or more codec and quality entries 650. Each codec and quality entry 650 may store information relating a particular combination of user device parameters with a particular combination of codec and quality level. Codec and quality entry 650 may include a device type field 652, a CPU load field 654, a bandwidth field 656, a codec field 658, and a quality level field 660.

Device type field 652 may store information identifying a particular device type. For example, device type field 652 may identify a particular user device type (e.g., mobile communication device, tablet computer, laptop computer, etc.), a make and model associated with the device type, a particular chipset associated with the device type, and/or other types of hardware information. Furthermore, device type field 652 may store information identifying particular software associated with the particular device type.

CPU load field 654 may store information identifying a particular range of processor load values. For example, the processor load range may be identified with a percentage based on, for example a number of processes/threads being handled by a processor compared to a process/thread capacity of the processor. As another example, the processor load range may include a particular range of queue lengths associated with the processor.

In some implementations, CPU load field 654 may include information identifying a particular video viewing application along with other applications running on user device 110. Thus, for example, a particular processor load may be identified based on a combination of applications running on user device 110.

Bandwidth field 656 may include bandwidth information associated with codec and quality entry 650. For example, bandwidth field 656 may specify a range of available bandwidth capacities (e.g., as a percentage of total capacity), a range of bitrates, a range of the number of available channels, a range of maximum throughputs, and/or a range specified in another measure of bandwidth capacity associated with service provider network 120.

Codec field 658 may identify a particular codec associated with codec and quality entry 650, such as, for example, an MPEG-2 codec, an MPEG-4 codec, an HEVC codec, and/or another codec. Quality level field 660 may identify a particular quality level associated with codec and quality entry 650. As an example, quality level field 660 may specify a particular quality level (e.g., MPEG-4 Quality Level 1, MPEG-4 Quality Level 2, etc.) associated with a stored copy of a video asset. As another example, a specified quality level could correspond to a standard definition, a high definition, and/or another type of definition associated with a particular quality level. As another example, quality level field 660 may specify one or more quality level parameters, such as a particular color depth, a particular chroma subsampling rate, a particular frame rate, particular bit rate, and/or one or more other video quality parameters associated with a stored copy of a video asset.

Although FIG. 6B shows exemplary components of codec and quality DB 630, in other implementations, codec and quality DB 630 may include fewer components, different components, differently arranged components, or additional components than depicted in FIG. 6B.

Figure 7:
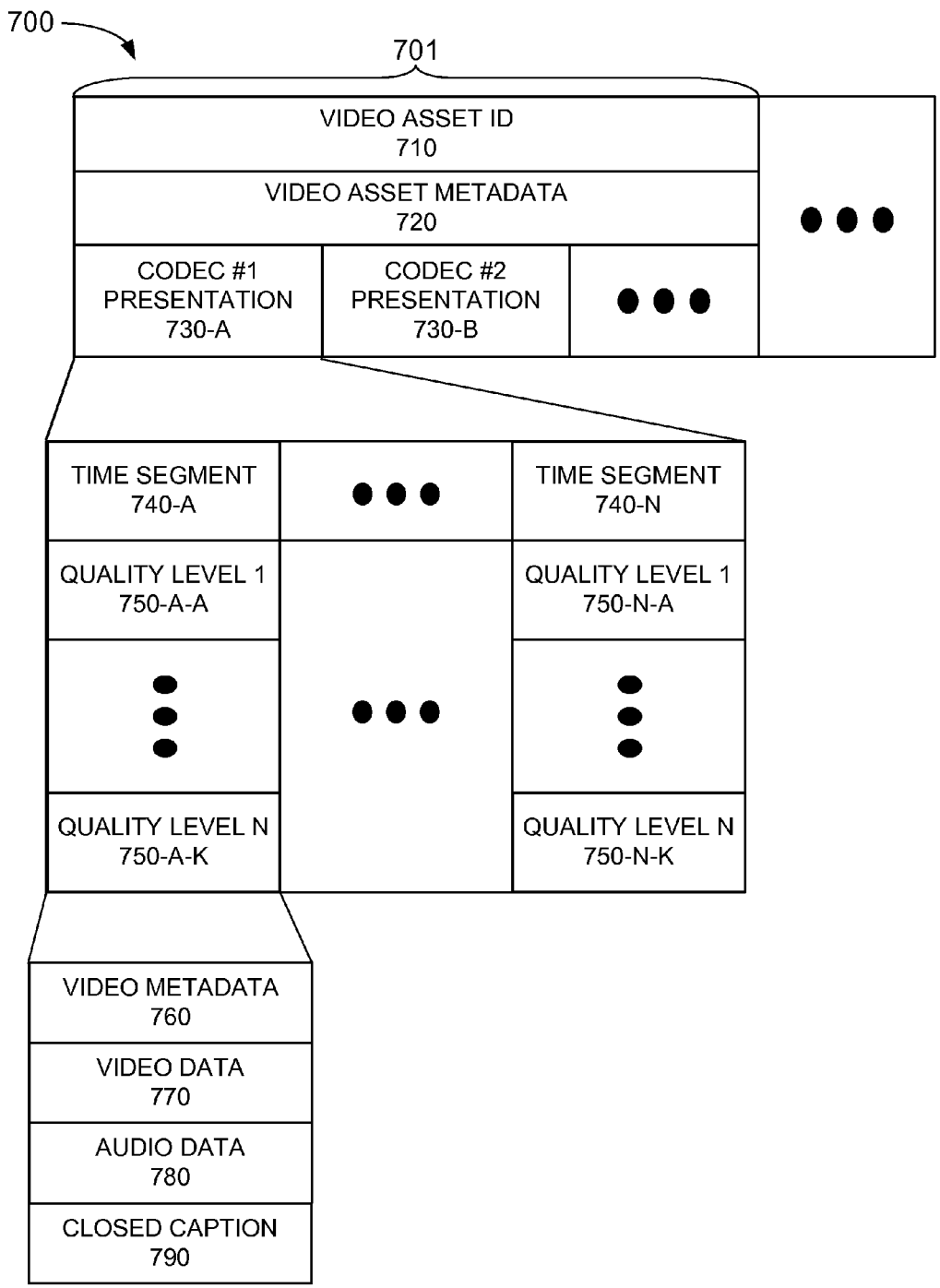
FIG. 7 is a diagram illustrating exemplary information that may be stored in a video asset record according to an implementation described herein.

FIG. 7 is a diagram illustrating exemplary components that may be stored in a video asset record 701 according to an implementation described herein. In some implementations, video asset record 701 may be stored in a storage device associated with CDN server 230, VOD server 225, and/or IMG server 220. In other implementations, video asset record 701 may be stored in a storage device associated with another component of VPS 130. Video asset record 701 may store information relating to a particular video asset. As shown in FIG. 7, video asset record 701 may include a video asset ID field 710, a video asset metadata field 720, and one or more video asset presentations 730.

Video asset ID field 710 may include an identifier associated with the particular video asset, such a number, a name, a title, and/or another type of identifier. Video metadata field 720 may store metadata associated with the particular video asset. The metadata may include, for example, a genre of the video asset; a category of the video asset; a text description, a key word index, and/or summary of the video asset; an image associated with the video asset; information associated with artists associated with the video asset; information associated with a type of video asset; a rating associated with the video asset; user reviews associated with the video asset; a price associated with the video asset; an availability period associated with the video asset; and/or other types of metadata.

Each video asset presentation 730 may store a presentation of the particular video asset encoded with a particular codec. For example, video asset presentation 730-A may store the particular video asset encoded using a first codec (e.g., MPEG-4 codec), video asset presentation 730-B may store the particular video asset encoded using a second codec (e.g., HEVC codec), etc. Video asset presentation 730 may include one or more one or more time segment records 740-A to 740-N. Each time segment record 740 may store information relating to a particular time segment of the particular video asset.

Time segment record 740 may include one or more quality level records 750. For example, time segment record 740-A may include quality level records 750-A-A to 750-A-K, time segment record 740-B may include quality level records 750-B-A to 750-B-K, etc., through time segment record 740-N, which may include quality level records 750-N-A to 750-N-K. Each quality level record 750 may include data for the particular time segment of the particular video asset presentation encoded with the particular codec at a particular quality level.

Quality record 750 may include a video metadata field 760, a video data field 770, an audio data field 780, and a closed caption data field 790. Metadata field 760 may store metadata associate with the particular time segment. Video data field 770 may store video data for the particular time segment, encoded with the particular codec at the particular quality level. Audio data field 780 may store audio data for the particular time segment, encoded with the particular codec at the particular quality level. Closed caption data field 790 may store close caption data for the particular time segment.

Although FIG. 7 shows exemplary components of video asset record 701, in other implementations, video asset record 701 may include fewer components, different components, differently arranged components, or additional components than depicted in FIG. 7.

Figure 8:
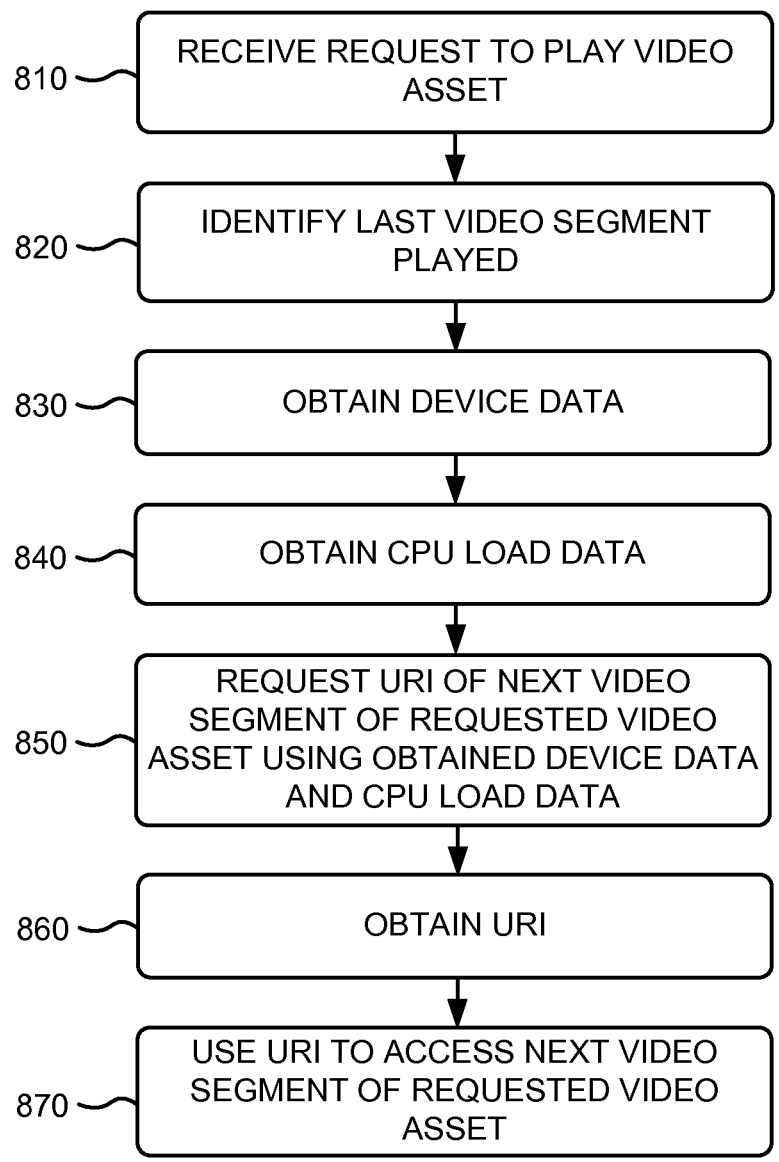
FIG. 8 is a flowchart for obtaining a video asset uniform resource identifier according to an implementation described herein.

FIG. 8 is a flowchart for obtaining a video asset uniform resource identifier according to an implementation described herein. In one implementation, the process of FIG. 8 may be performed by user device 110. In other implementations, some or all of the process of FIG. 8 may be performed by another device or a group of devices separate from and/or including user device 110.

The process of FIG. 8 may include receiving a request to play a video asset (block 810). For example, a user may activate video application 501, or another application, such as a browser application, may browse a collection of available video assets, and may select to play a particular video asset.

A last video segment played may be identified (block 820). For example, video session component 520 may access profile server 245 to retrieve the last position or segment played for the user for the requested video asset and may provide the retrieved information to segment adaptation component 550. Device data may be obtained (block 830) and CPU load data may be obtained (block 840). For example, segment adaptation component 550 may retrieve device type data from a storage device of user device 110 and may obtain CPU load data from each CPU associated with user device 110. The device type data may include, for example, information identifying a particular user device type, a make and model associated with user device 110, a particular chipset associated with user device 110, a particular software application associated with user device 110, a particular operating system associated with user device 110, and/or other types of user device information.

The CPU load data may include information identifying the number of CPUs included in user device 110, how many of the CPUs are active, and/or a particular processor load associated with each CPU. The processor load may include a percent of available processor capacity, the number of processes/threads being handled by a CPU, a queue length associated with a CPU, and/or other types of CPU load information. Furthermore, in some implementations, the processor load information may include information identifying a particular video viewing application along with other applications running on user device 110.

A URI of the next video segment for the requested video asset may be requested using the obtained device data and the obtained CPU load data (block 850) and the URI may be obtained (block 860). For example, segment adaptation component 550 may request the URI of the next video segment for the requested video asset from catalog server 235 and catalog server 235 may provide the requested URI to user device 110. The obtained URI may be used to access the next video segment of the requested video asset (block 870). For example, segment download component 540 may use the obtained URI to download the video segment from a storage location associated with CDN server 230, VOD server 225, and/or another component of VPS 130.

Figure 9:
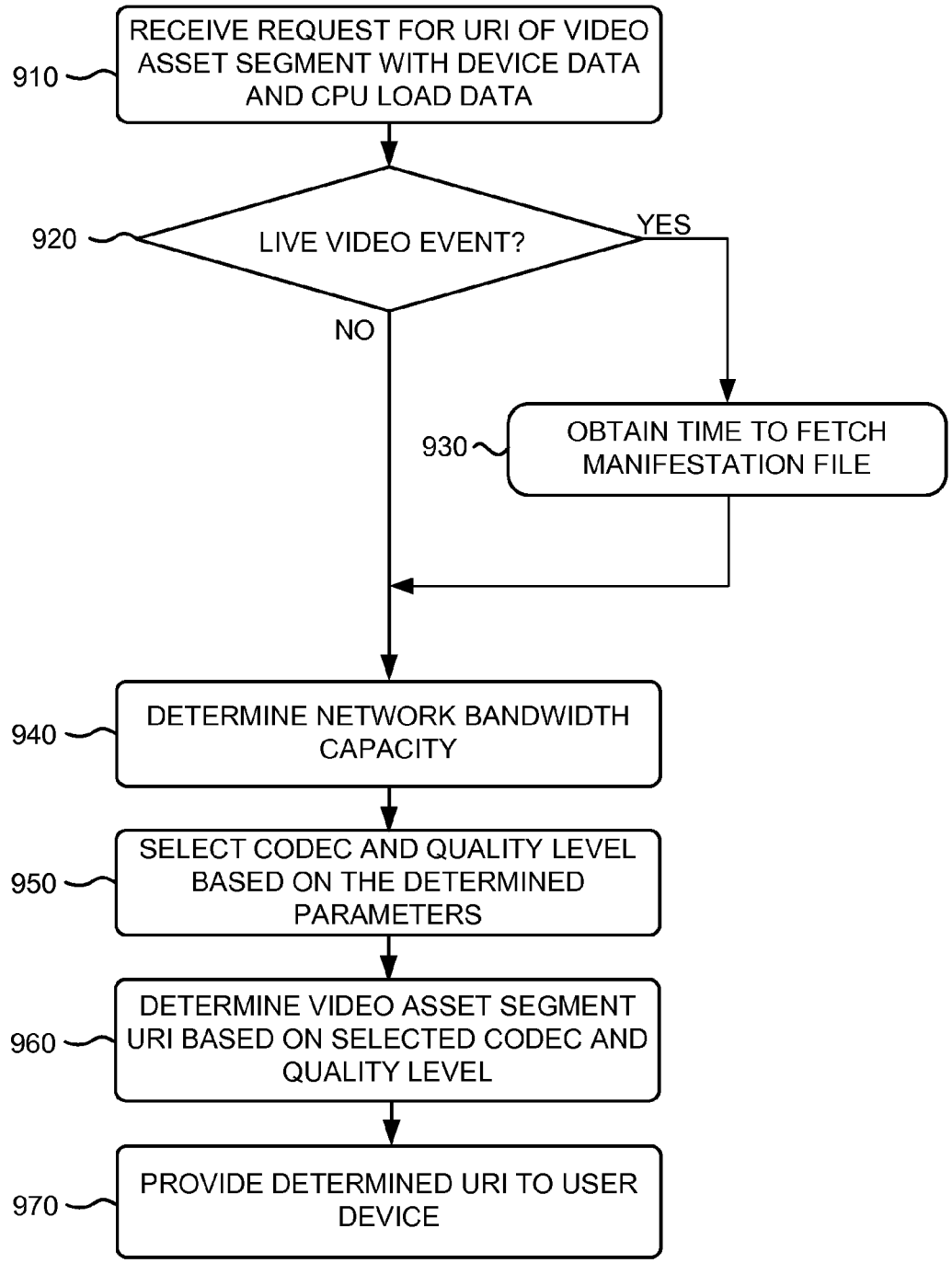
FIG. 9 is a flowchart for selecting a video asset codec and quality according to an implementation described herein.

FIG. 9 is a flowchart for selecting a video asset codec and quality according to an implementation described herein. In one implementation, the process of FIG. 9 may be performed by catalog server 235. In other implementations, some or all of the process of FIG. 9 may be performed by another device or a group of devices separate from and/or including catalog server 235.

The process of FIG. 9 may include receiving a request for a video asset URI that includes device data and CPU load data (block 910). For example, catalog server 235 may receive a request from user device 110 for a URI for a particular segment of a requested video asset. A determination may be made as to whether the requested video asset corresponds to a live video event (block 920). For example, codec and quality selector 620 may access URI DB 640 to determine whether the requested video asset corresponds to a live video event, such as a live sports broadcast. If it is determined that the requested video asset corresponds to a live video event (block 920-YES), the time to fetch the manifestation file may be obtained (block 930). For example, codec and quality selector 620 may query user device 110, CDN server 230, VOD server 225, IMG server 220, and/or another device to determine the time to fetch the manifestation file for the live video event for user device 110. The time to fetch the manifestation file may be used by codec and quality selector 620 in selecting a quality level for the requested video asset.

Returning to block 920, if it is determined that the requested video asset does not correspond to a live video event (block 920-NO), processing may continue to determine network bandwidth capacity (block 940). For example, codec and quality selector 620 may query one or more devices associated with service provider network 120 to determine a network bandwidth capacity associated with a connection to user device 110. For example, codec and quality selector 620 may query user device 110, a base station and/or another wireless access network device providing a wireless connection to user device 110, an optical network terminal, a router, a switch, a local head end office, a server device maintaining network statistics for service provider network 120, and/or one or more other devices, to determine a current network bandwidth capacity.

Codec and quality selector 620 may obtain network bandwidth capacity data from the queried one or more devices. The network bandwidth capacity data may include bitrate data for the connection to user device 110, a number of available channels (e.g., wireless channels) and type of available channels, a percent capacity for the connections and/or for particular channels of the connection, a maximum throughput for the connection, and/or other types of bandwidth capacity data.

A codec and quality level may be determined based on the determined parameters (block 950). For example, codec and quality selector 620 may select a codec for the requested video asset based on the device type and the CPU load data associated with user device 110. As an example, if the determine processor load is below a processor load threshold, codec and quality selector 620 may select a first codec (e.g., an HEVC codec) and if the processor load is above the processor load threshold, codec and quality selector 620 may select a second codec (e.g., an MPEG-4 codec). Furthermore, codec and quality selector 620 may select a particular quality level for the video asset based on the determined network bandwidth capacity. Moreover, if the requested video asset corresponds to a live video event, codec and quality selector 620 may use the determined time to fetch the manifestation file for the requested video asset to determine the quality level. Codec and quality selector 620 may access codec and quality DB 630 to select the codec and the quality level for the requested video asset.

A video asset segment URI may be determined based on the selected codec and quality level (block 960) and the determined video asset segment URI may be provided to the user device (block 970). For example, codec and quality selector 620 may access URI DB 640 to retrieve a URI for the requested video segment of the requested video asset encoded with the selected codec and quality level. User device interface 610 may provide the retrieved URI to user device 110.

Figure 10:
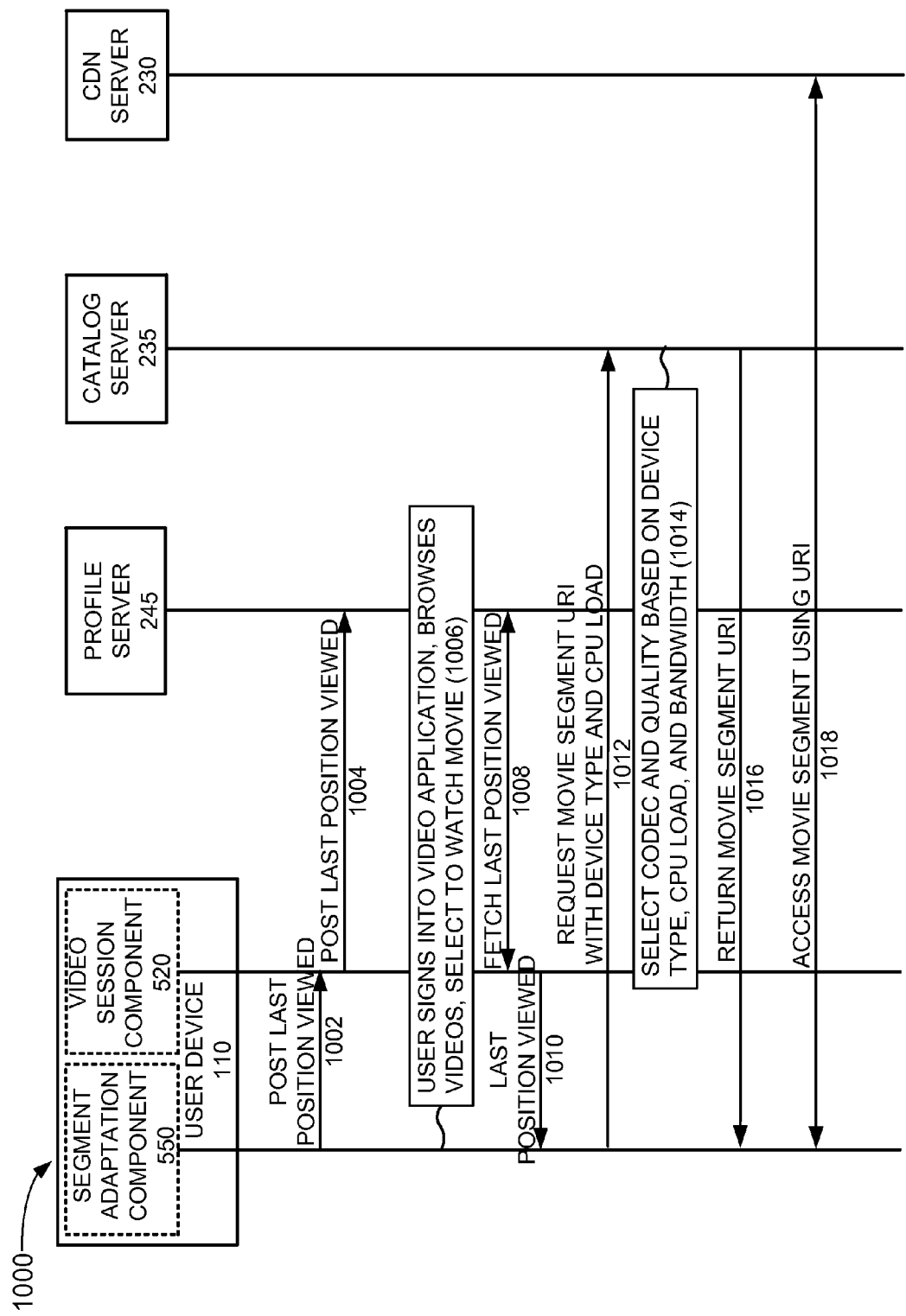
FIG. 10 is a diagram of an exemplary signal flow according to an implementation described herein.

FIG. 10 is a diagram of an exemplary signal flow 1000 according to an implementation described herein. As shown in FIG. 10, signal flow 1000 may include segment adaptation component 550 posting the last position viewed for a movie to video session component 520 (signal 1002) and video session component 520 may post the last position viewed for the movie to profile server 245 (signal 1004). Profile server 245 may store the last position viewed for the movie in the user's profile.

At a later time, the user may sign into video application 501, may browse videos, and may select to continue to play the movie (signal 1006). In response, video session component 520 may fetch information identifying the last position viewed for the movie from profile server 245 (signal 1008) and may provide the fetched information to segment adaptation component 550 (signal 1010). Segment adaptation component 550 may obtain device type data and current processor load data for user device 110 and may request, from catalog server 235, a URI for the next movie segment using the information identifying the last position played, the obtained device type data, and the obtained processor load data (signal 1012).

Catalog server 235 may select a codec for the next movie segment based on the device type data and the processor load data, may determine a current network bandwidth capacity for a connection to user device 110, and may select a quality level for the next movie segment based on the determined network bandwidth capacity (signal 1014). Catalog server 235 may then select a URI for the next movie segment based on the selected codec and quality level and may provide the selected URI to segment adaptation component 550 (signal 1016). Segment adaptation component 550 may then instruct segment download component 540 to use the received URI to download the next movie segment from CDN server 230 (signal 1018).

Figure 11:
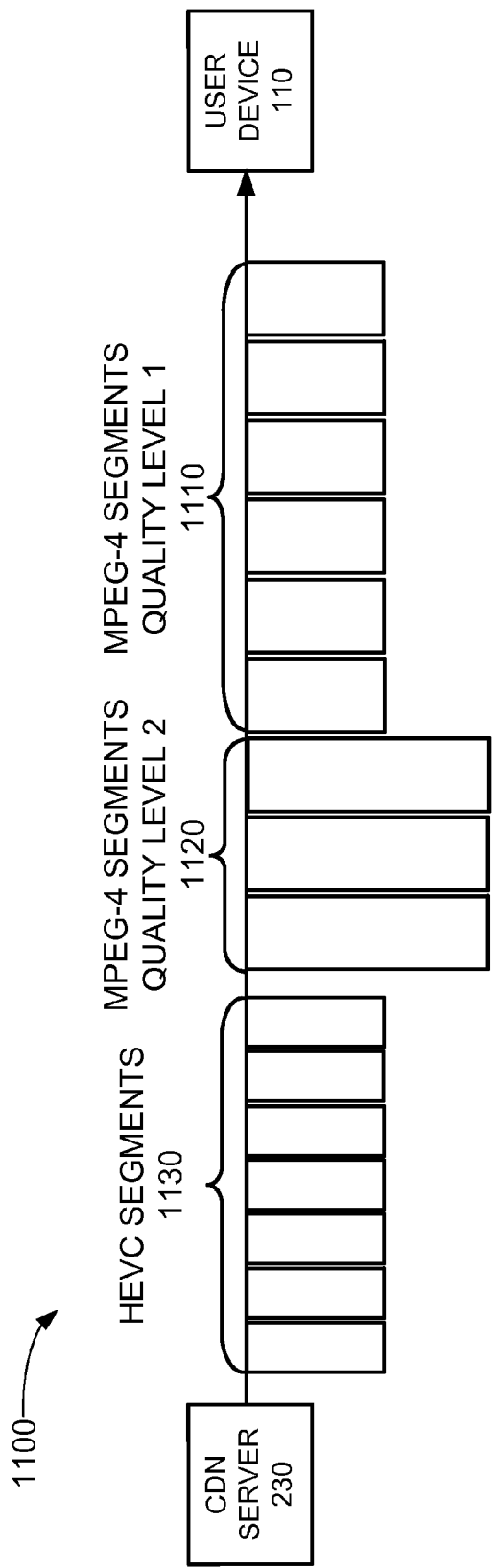
FIG. 11 is a diagram of an exemplary transmission sequence according to an implementation described herein.

FIG. 11 is a diagram of an exemplary transmission sequence 1100 according to an implementation described herein. As shown in FIG. 11, transmission sequence 1100 may include CDN server 230 transmitting video asset segments to user device 110 based on URI requests made by user device 110 based on URIs obtained from catalog server 235. In transmission sequence 1100, user device 110 may be experiencing a high processor load because of another application running on user device 110. Thus, catalog server 235 may select an MPEG-4 codec for the video asset, as user device 110 may not have enough processing power to handle a HEVC codec. Furthermore, a connection to user device 110 may be experiencing a large amount of traffic, resulting in a low network bandwidth capacity available via service provider network 120. Thus, CDN server 230 may transmit video asset segments 1110 encoded with an MPEG-4 codec at quality level 1.

At a later time, the connection may experience less traffic and the network capacity may increase. Thus, catalog server 235 may select a higher quality level and CDN server 230 may transmit video asset segments 1120 encoded with an MPEG-4 codec at quality level 2. At a still later time, the other application running on user device 110 may close and user device 110 may experience a decrease in processor load. Catalog server 235 may select a higher efficiency codec for the upcoming video asset segments and CDN server 230 may transmit video asset segments 1130 encoded with an HEVC codec to user device 110. In this manner, user device 110 may play video assets at an optimal quality based on real-time bandwidth and CPU load capacity.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8 and 9, and a series of signal flows have been described with respect to FIG. 10, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
    receiving, by the computer device via a network, a request for a video asset from a user device, wherein the request includes information identifying a device type associated with the user device and a processor load associated with the user device, wherein the computer device includes a database that stores Uniform Resource Identifiers for particular video assets;
    obtaining, by the computer device, information identifying a last viewed position for the requested video asset for a user account associated with the user device;
    identifying, by the computer device, a segment of the requested video asset based on the obtained information identifying the last viewed position for the requested video asset;
    determining, by the computer device, a bandwidth capacity associated with a connection to the user device;
    selecting, by the computer device, a codec and a quality level for the requested video asset based on the device type, the processor load, and the determined bandwidth capacity;
    identifying, by the computer device, a Uniform Resource Identifier associated with the selected codec and quality level for the requested video asset using the database, wherein identifying the Uniform Resource Identifier associated with the selected codec and quality level for the requested video asset includes:
    identifying a segment Uniform Resource Identifier associated with the selected codec and quality level for the identified segment of the requested video asset;
    providing, by the computer device via the network, the identified segment Uniform Resource Identifier to the user device;

receiving, by the computer device via the network, a request for a next segment of the requested video asset from the user device, wherein the request for the next segment includes
processor load information that indicates that the processor load associated with the user device has changed;
selecting, by the computer device, a different codec for the requested video asset, based on the processor load information that indicates that the processor load associated with the user device has changed;
identifying, by the computer device, a different Uniform Resource Identifier associated with the different codec for the requested video asset using the database; and
providing, by the computer device via the network, the identified different Uniform Resource Identifier to the user device.

2. The method of claim 1, wherein selecting the codec and the quality level includes selecting a Moving Picture Experts Group Four (MPEG-4) codec or selecting a High Efficiency Video Coding (HEVC) codec.

3. The method of claim 1, wherein selecting the codec and the quality level includes:
determining that the device type is not configured to handle a High Efficiency Video Coding (HEVC) codec; and
selecting a Moving Picture Experts Group Four (MPEG-4) codec, in response to determining that the device type is not configured to handle the HEVC codec.

4. The method of claim 1, wherein selecting the codec and the quality level includes:
determining that the processor load is higher than a processor load threshold associated with a High Efficiency Video Coding (HEVC) codec; and
selecting a Moving Picture Experts Group Four (MPEG-4) codec, in response to determining that the processor load is higher than the processor load threshold associated with the HEVC codec.

5. The method of claim 1, wherein selecting the codec and the quality level includes:
dynamically selecting the quality level based on the determined bandwidth capacity, wherein the quality level includes one or more of:
a particular color depth;
a particular chroma subsampling rate;
a particular frame rate; or
a particular bit rate.

6. The method of claim 1, further comprising:
determining that the requested video asset corresponds to a live transmission;
determining a time to fetch a manifestation file for the requested video asset; and
wherein selecting the codec and the quality level is further based on the determined time to fetch the manifestation file for the requested video asset.

7. The method of claim 1, wherein selecting the different codec for the requested video asset includes changing from one of a High Efficiency Video Coding (HEVC) codec and a Moving Picture Experts Group Four (MPEG-4) codec to another one of the HEVC codec and the MPEG-4 codec.

8. A computer device comprising:
logic configured to:
receive, via a network, a request for a video asset from a user device, wherein the request includes information identifying a device type associated with the user device and a processor load associated with the user device, wherein the computer device includes a database that stores Uniform Resource Identifiers for particular video assets;
obtain information identifying a last viewed position for the requested video asset for a user account associated with the user device;
identify a segment of the requested video asset based on the obtained information identifying the last viewed position for the requested video asset;
determine a bandwidth capacity associated with a connection to the user device;
select a codec and a quality level for the requested video asset based on the device type, the processor load, and the determined bandwidth capacity;
identify a Uniform Resource Identifier associated with the selected codec and quality level for the requested video asset using the database, wherein, when identifying the Uniform Resource Identifier associated with the selected codec and quality level for the requested video asset, the logic is further configured to:
identify a segment Uniform Resource Identifier associated with the selected codec and quality level for the identified segment of the requested video asset;
provide, via the network, the identified segment Uniform Resource Identifier to the user device;
receive, via the network, a request for a next segment of the requested video asset from the user device, wherein the request for the next segment includes
processor load information that indicates that the processor load associated with the user device has changed;
select a different codec for the requested video asset, based on the processor load information that indicates that the processor load associated with the user device has changed;
identify a different Uniform Resource Identifier associated with the different codec for the requested video asset using the database; and
provide, via the network, the identified different Uniform Resource Identifier to the user device.

9. The computer device of claim 8, wherein when selecting the codec and the quality level, the logic is further configured to:
select a Moving Picture Experts Group Four (MPEG-4) codec or selecting a High Efficiency Video Coding (HEVC) codec.

10. The computer device of claim 8, wherein when selecting the codec and the quality level, the logic is further configured to:
determine that the device type is not configured to handle a High Efficiency Video Coding (HEVC) codec; and
select a Moving Picture Experts Group Four (MPEG-4) codec, in response to determining that the device type is not configured to handle the HEVC codec.

11. The computer device of claim 8, wherein when selecting the codec and the quality level, the logic is further configured to:
determine that the processor load is higher than a processor load threshold associated with a High Efficiency Video Coding (HEVC) codec; and
select a Moving Picture Experts Group Four (MPEG-4) codec, in response to determining that the processor load is higher than the processor load threshold associated with the HEVC codec.

12. The computer device of claim 8, wherein when selecting the codec and the quality level, the logic is further configured to:
select the quality level based on the determined bandwidth capacity, wherein the quality level includes one or more of:
a particular color depth;

a particular chroma subsampling rate;
a particular frame rate; or
a particular bit rate.

13. The computer device of claim 8, wherein the logic is further configured to:
   determine that the requested video asset corresponds to a live transmission;
   determine a time to fetch a manifestation file for the requested video asset; and
   wherein the logic is further configured to select the codec and the quality level based on the determined time to fetch the manifestation file for the requested video asset.

14. A non-transitory computer-readable medium storing instructions executable on one or more processors, the non-transitory computer-readable medium comprising:
   one or more instructions to receive, by a computer device and via a network, a request for a video asset from a user device, wherein the request includes information identifying a device type associated with the user device and a processor load associated with the user device, wherein the computer device includes a database that stores Uniform Resource Identifiers for particular video assets;
   one or more instructions to obtain information identifying a last viewed position for the requested video asset for a user account associated with the user device;
   one or more instructions to identify a segment of the requested video asset based on the obtained information identifying the last viewed position for the requested video asset;
   one or more instructions to determine a bandwidth capacity associated with a connection to the user device;
   one or more instructions to select a codec and a quality level for the requested video asset based on the device type, the processor load, and the determined bandwidth capacity;
   one or more instructions to identify a Uniform Resource Identifier associated with the selected codec and quality level for the requested video asset using the database, wherein, the one or more instructions to identify the Uniform Resource Identifier associated with the selected codec and quality level for the requested video asset further include:
   one or more instructions to identify a segment Uniform Resource Identifier associated with the selected codec and quality level for the identified segment of the requested video asset;
   one or more instructions to provide, via the network, the identified segment Uniform Resource Identifier to the user device;
   one or more instructions to receive, via the network, a request for a next segment of the requested video asset from the user device, wherein the request for the next segment includes
   processor load information that indicates that the processor load associated with the user device has changed;
   one or more instructions to select a different codec for the requested video asset, based on the processor load information that indicates that the processor load associated with the user device has changed;
   one or more instructions to identify a different Uniform Resource Identifier associated with the different codec for the requested video asset using the database; and
   one or more instructions to provide, via the network, the identified different Uniform Resource Identifier to the user device.

15. The non-transitory computer-readable medium of claim 14, wherein the one or more instructions to select the codec and the quality level for the requested video asset include:
   one or more instructions to determine that the processor load is higher than a processor load threshold associated with a High Efficiency Video Coding (HEVC) codec; and
   one or more instructions to select a Moving Picture Experts Group Four (MPEG-4) codec, in response to determining that the processor load is higher than the processor load threshold associated with the HEVC codec.

16. The method of claim 1, wherein the processor load information includes information identifying a number of active central processing units (CPUs).

17. The method of claim 1, wherein the processor load information includes at least one of:
   a percent capacity for a particular processor;
   a number of threads being handled by the particular processor; or
   a queue length associated with the particular processor.

18. The method of claim 1, wherein the processor load information includes information identifying applications running on the user device.

* * * * *